(12) United States Patent
Wang (10) Patent No.: US 11,513,634 B2
(45) Date of Patent: Nov. 29, 2022

(54) ELECTROMAGNETIC PEN DISPLAY AND METHOD FOR DRIVING SAME

(71) Applicant: Shenzhen Huion Animation Technology Co., Ltd., Shenzhen (CN)

(72) Inventor: Zhouhong Wang, Shenzhen (CN)

(73) Assignee: SHENZHEN HUION ANIMATION TECHNOLOGY CO., LTD., Shenzhen (CN)

( * ) Notice: Subject to any disclaimer, the term of this patent is extended or adjusted under 35 U.S.C. 154(b) by 0 days.

(21) Appl. No.: 17/462,076

(22) Filed: Aug. 31, 2021

(65) Prior Publication Data
US 2022/0121341 A1    Apr. 21, 2022

(30) Foreign Application Priority Data

Oct. 16, 2020  (CN) .......................... 202011107796.2
Oct. 16, 2020  (CN) .......................... 202022307026.4

(51) Int. Cl.
| | | |
|---|---|---|
| *G06F 3/041* | (2006.01) | |
| *G02F 1/1333* | (2006.01) | |
| *G06F 3/046* | (2006.01) | |
| *G09G 3/34* | (2006.01) | |
| *G09G 3/36* | (2006.01) | |

(52) U.S. Cl.
CPC ...... *G06F 3/04184* (2019.05); *G02F 1/13338* (2013.01); *G06F 3/046* (2013.01); *G06F 3/0412* (2013.01); *G09G 3/3426* (2013.01); *G09G 3/3611* (2013.01); *G09G 2320/0626* (2013.01)

(58) Field of Classification Search
CPC .... G06F 3/04184; G06F 3/0412; G06F 3/046; G06F 3/3426; G06F 3/3611; G09G 2320/0626; G02F 1/13338
See application file for complete search history.

(56) References Cited

U.S. PATENT DOCUMENTS

| | | | |
|---|---|---|---|
| 10,627,974 B1 * | 4/2020 | Lee ..................... | G02B 6/0068 |
| 2017/0153748 A1 * | 6/2017 | Choi .................... | H03K 17/962 |
| 2018/0188832 A1 * | 7/2018 | Coppin ............... | G06F 3/03545 |
| 2018/0292943 A1 * | 10/2018 | Files ................... | G06F 3/04184 |

* cited by examiner

*Primary Examiner* — David Tung
(74) *Attorney, Agent, or Firm* — IPro, PLLC (57) ABSTRACT

The present disclosure discloses an electromagnetic pen display, which includes a display module, a light emitting module and an electromagnetic input module. The display module includes a liquid crystal display panel configured to display image frame and a dynamic dimming pad. The dynamic dimming pad being configured to generate a dynamic dimming signal based on information of the display image frame of the liquid crystal display panel. The light emitting module includes a light source driving board and a plurality of light sources. The light sources being correspondingly electrically connected to the light source driving board, the light source driving board being configured to correspondingly dynamically driving a light emission luminance of the plurality of light sources in response to receiving a dynamic dimming signal from the dynamic dimming pad. The electromagnetic input module is configured to selectively receive a write input signal. The present discloses further provides a method for driving the same.

8 Claims, 8 Drawing Sheets

ELECTROMAGNETIC PEN DISPLAY AND METHOD FOR DRIVING SAME

FIELD OF THE PRESENT DISCLOSURE

The present disclosure relates to a handwriting input device, and more particular, relates to an electromagnetic pen display and method for driving the same.

DESCRIPTION OF RELATED ART

Figure 1:
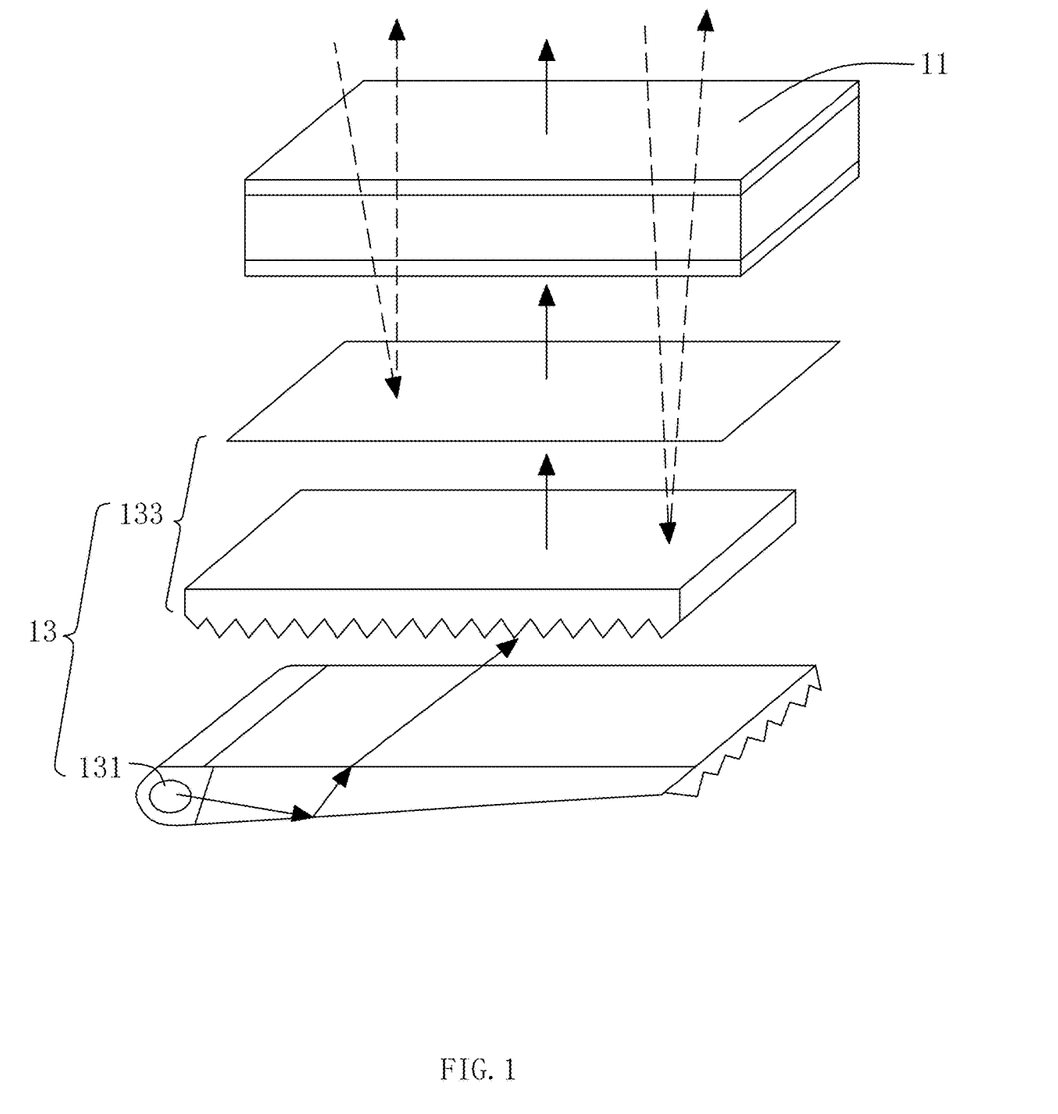
FIG. 1 is a schematic perspective exploded view of a liquid crystal display device according to the related art.

A liquid crystal display device is a light transmissive display device, which is mainly constituted by a backlight module 13 and a liquid crystal display module 11 that are stacked, as illustrated in FIG. 1. When the liquid crystal display panel 11 operates, the backlight module 13 needs to provide light which is transmitted through the liquid crystal display panel 11 to display an image.

The backlight module 13 includes a light source 131 and a light guiding device 133. The light source 131 generates light, and the light is guided by the light guiding device 133 to the liquid crystal display panel 11. Upon transmitting through the liquid crystal display panel 11, the light enters human eyes to present the displayed image.

Figure 2A:
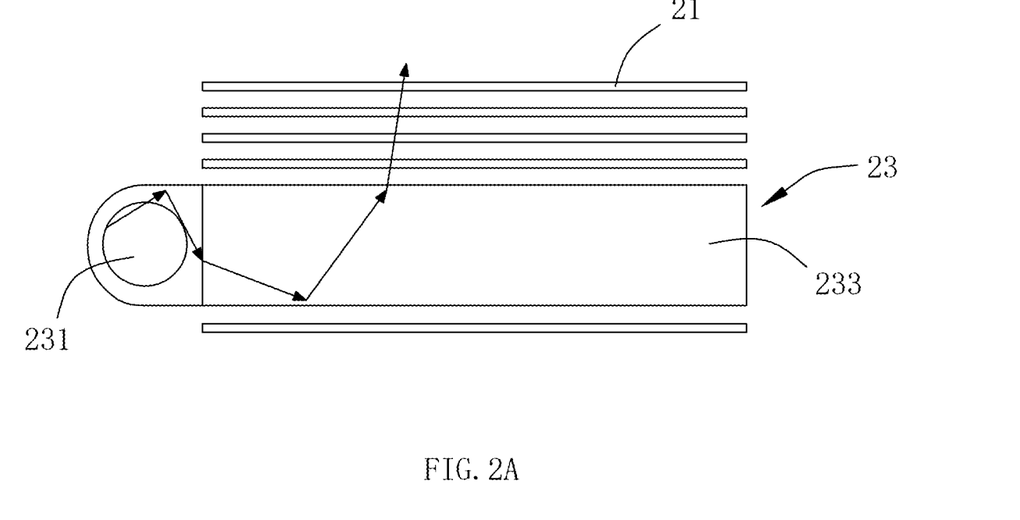
FIG. 2A and FIG. 2B are schematic perspective exploded views of a side backlight module and a direct backlight module according to the related art.
Figure 2B:
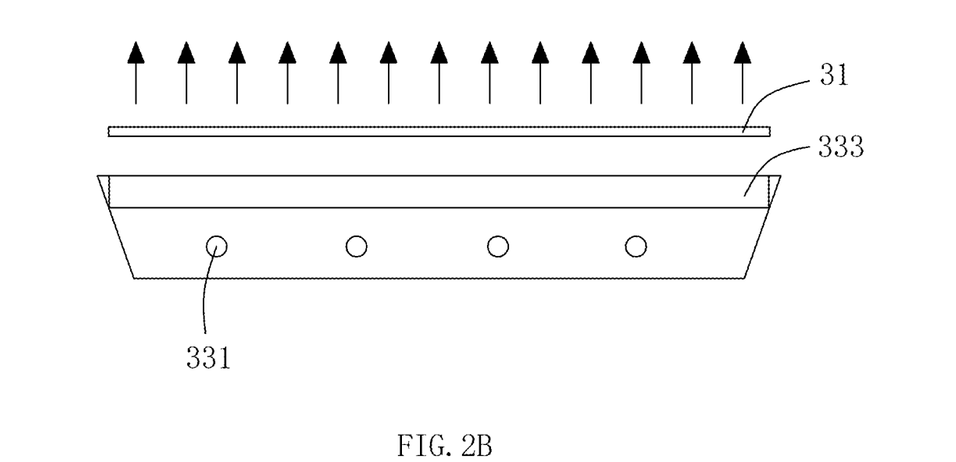

According to the position of the light source 131 relative to the light guiding device 133, the backlight module 13 is categorized into a side backlight module and a direct backlight module, as illustrated in FIG. 2A and FIG. 2B.

As illustrated in FIG. 2A, a side backlight module 23 in the related art includes a linear light source 231 and a light guiding plate 233. The linear light source 231 is arranged on a side surface of the light guiding plate 233. For example, the linear light source 231 is a cold-cathode fluorescent lamp (CCFL) or a light bar. The linear light source 231 emits to generate light, and the light enters form the side surface of the light guiding plate 233 to the light guiding plate 233, and is guided by the light guiding plate 233 and emitted from a light exit surface. In this way, the linear light source 231 is converted to a surface light source having uniform light intensity distribution.

In the side backlight module 23, the light source 231 is a constant-on linear light source, that is, the linear light source 231 receives a constant drive voltage and generates a uniform light intensity. The linear light source 231 constantly supplies a rated light intensity to the liquid crystal display panel 21.

However, the side backlight module 23 has the following defects: since the linear light source 231 is an CCFL and arranged on the side surface of the light guiding plate 233, and a light emission efficiency output by the linear light source 231 is a constant drive voltage, the light emission efficiency of the backlight fails to be dynamically adjusted with respect to the display image on the liquid crystal display panel 21, and the backlight module fails to be divided into small regions for dynamic control. The side light emitting structure fails to implement dynamic adjustment of backlight, and the cost is high.

As illustrated in FIG. 2B, another liquid crystal display device employing the direct backlight module is illustrated. A light source 331 includes a plurality of dot light sources that are arranged into an array. The dot light sources are light emitting diodes. A light guiding device 333 is constituted by a plurality of optical films that are stacked. The optical films are stacked on the dot light sources 331 that are arrayed. When the dot light sources 331 operate, light beams generated are directly transmitted through the light guiding device 333 to a liquid crystal display panel 31 to display an image.

according to the actual needs, for dynamic adjustment of display luminance in different regions, in the related art the plurality of dot light sources 331 are arranged in different regions. With respect to different display regions, different dynamic dot light source driving schemes are defined. According to the display needs of each frame of video signals, grayscale information of different regions is adjusted for the backlight module. The dot light sources in different regions of the backlight module, under different drive voltages, dynamically emit light, that is, local dimming rendering.

In the direct backlight module, the dot light sources are LEDs. Different drive signals achieve different light emission efficiencies of the LEDs.

Figure 3:
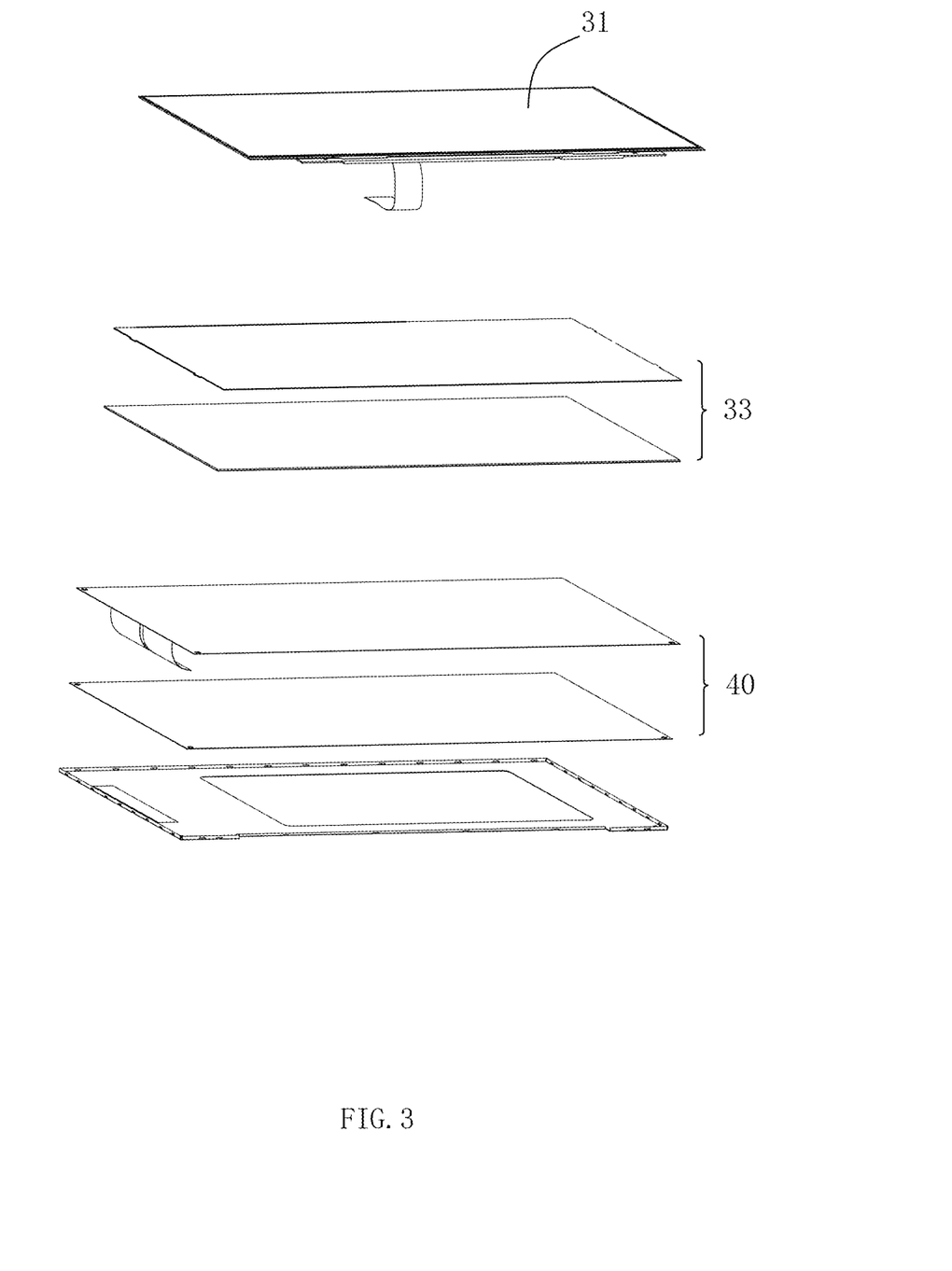
FIG. 3 is a schematic structural view of an electromagnetic pen display according to the related art.

In another aspect, an electromagnetic display panel in the related art is an integral side light emitting structure formed by integrating an electromagnetic panel 40 and a liquid crystal display panel 31. As illustrated in FIG. 3, the electromagnetic panel 40 is stacked on an outer side of the backlight module 33. Image display on the liquid crystal display panel 31 and touch input of the electromagnetic panel 40 are carried out simultaneously.

In this operating mode, a drive signal of the liquid crystal display panel 31 inevitably causes interference to a touch scan signal of the electromagnetic panel 40, causing an increase of a touch sense amount. That is, a data report rate is obviously lowered. In addition, a distance from a touch sensor layer to the light sources of the backlight module 33 is shortened. During image display, a light source drive signal of the backlight module 33 still exerts a greater impact on the touch scan signal of the electromagnetic panel 40, such that an actual data report rate of the electromagnetic panel 40 is affected.

Therefore, it is urgent to provide a new electromagnetic pen display and a driving method to solve the above problem.

BRIEF DESCRIPTION OF THE DRAWINGS

Many aspects of the exemplary embodiments can be better understood with reference to the following drawings. The components in the drawing are not necessarily drawn to scale, the emphasis instead being placed upon clearly illustrating the principles of the present disclosure.

DETAILED DESCRIPTION OF THE EXEMPLARY EMBODIMENTS

The present disclosure will hereinafter be described in detail with reference to several exemplary embodiments. To make the technical problems to be solved, technical solutions and beneficial effects of the present disclosure more apparent, the present disclosure is described in further detail together with the figure and the embodiments. It should be understood the specific embodiments described hereby is only to explain the disclosure, not intended to limit the disclosure.

Figure 4:
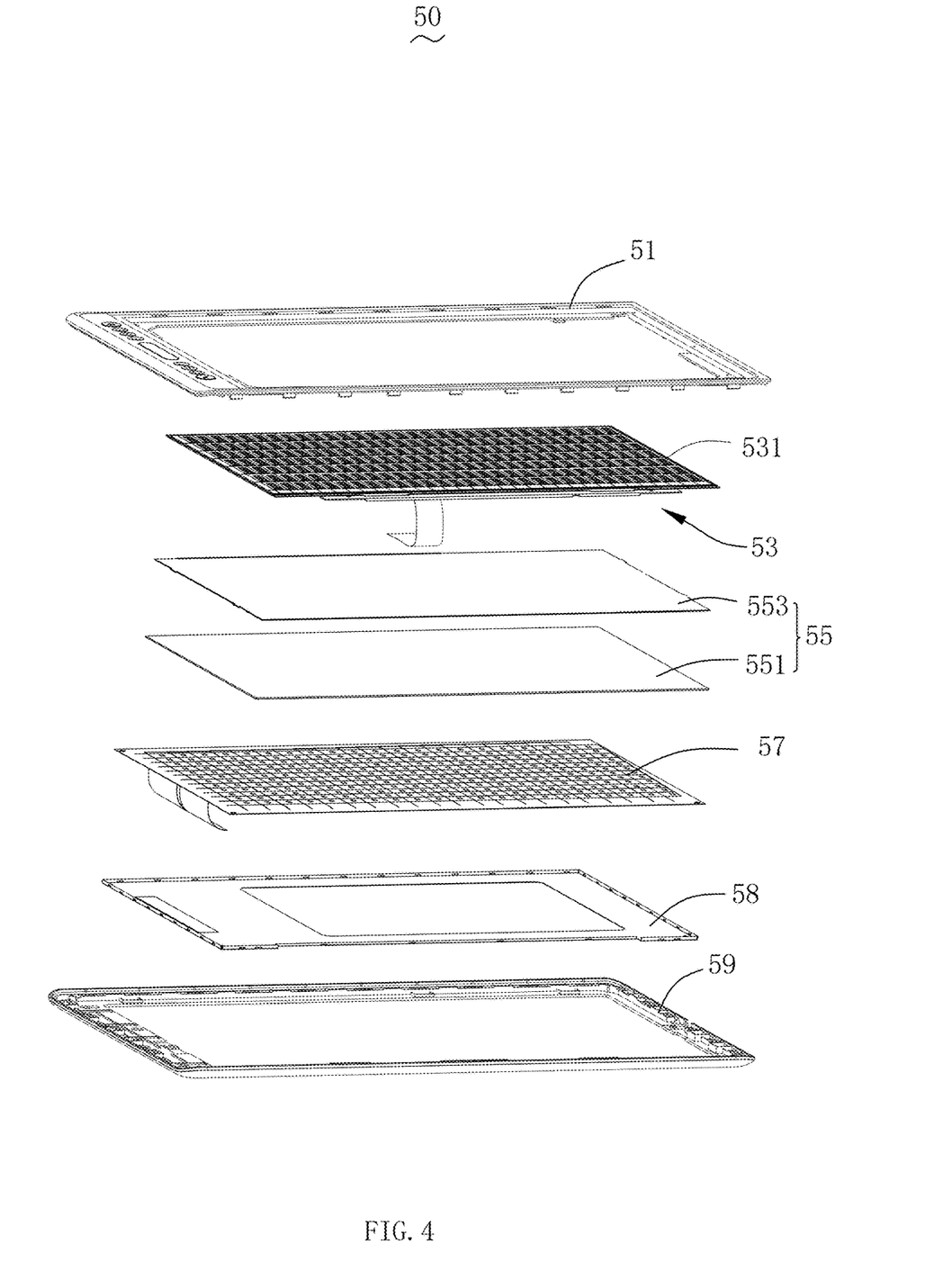
FIG. 4 is a schematic perspective exploded view of an electromagnetic pen display according to an embodiment of the present disclosure.
Figure 5:
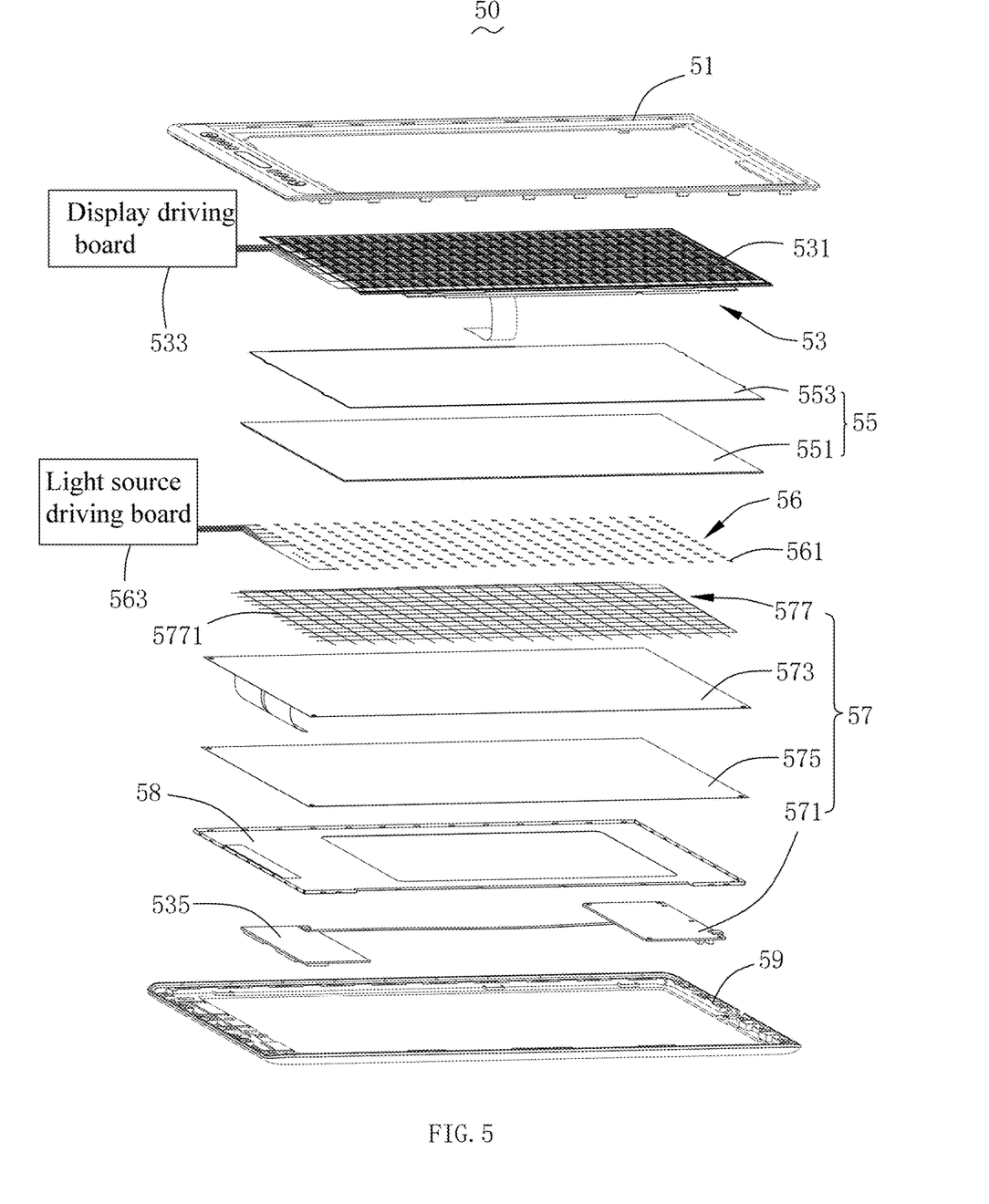
FIG. 5 is a schematic exploded view of the electromagnetic pen display in FIG. 4 with an electromagnetic input module being assembled.

Referring to FIG. 4 and FIG. 5, FIG. 4 is a schematic exploded view of an electromagnetic pen display 50 according to an embodiment of the present disclosure, and FIG. 5 is a schematic exploded view of the electromagnetic pen display 50 with an electromagnetic input module 57 being assembled. The electromagnetic pen display 50 includes an upper case 51, a display module 53, a light guiding module 55, a light emitting module 56, an electromagnetic input module 57, a backplane 58, and a lower case 59.

The upper case 51 and the lower case 59 collaboratively enclose a receiving space configured to receive the display module 53, the light guiding module 55, the light emitting module 56, the electromagnetic input module 57, and the backplane 58. The display module 53, the light guiding module 55, the electromagnetic input module 57, and the backplane 58 are stacked in sequence along a direction from the upper case 51 to the lower case 59. The light emitting module 56 is integrated in the electromagnetic input module 57.

Figure 6:
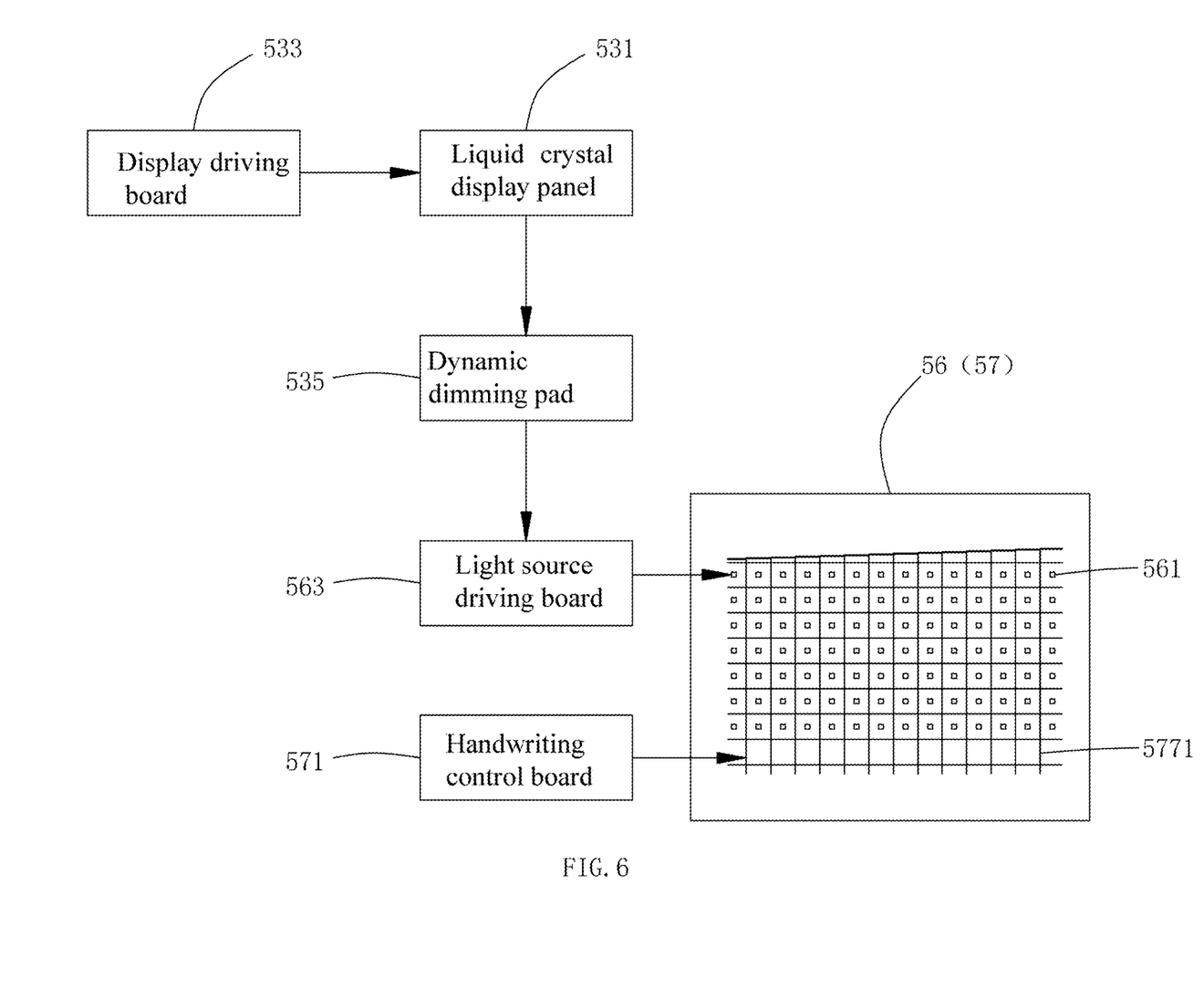
FIG. 6 is an operating principle block diagram of the electromagnetic pen display in FIG. 4.

Referring to FIG. 6, an operating principle block diagram of the electromagnetic pen display in FIG. 4 is illustrated. The display module 53 includes a liquid crystal display panel 531 and a display driving board 533. The display driving board 533 generates a drive signal to drive the liquid crystal display panel 531 to display an image. The liquid crystal display panel 531 is configured to display a frame image.

Still referring to FIG. 4 and FIG. 5, the light guiding module 55 guides a light beam to pass through the display module 53 and light the liquid crystal display panel 531 to display the image. The light guiding module 55 includes a light guiding plate 551, at least one optical film 553 and an enhanced frame (not illustrated). The optical film 553 is stacked on a surface of the light guiding plate 551. The enhanced frame fixes and holds the light guiding plate 551 and the optical film 553.

The light emitting module 56 is arranged on a side of the light guiding plate 551 proximal to the light guiding module 55. The light emitting module 56 includes a plurality of dot light sources 561 and a light source driving board 563. The dot light source 561 is a light emitting diode, and the plurality of dot light sources 561 are arranged into an array. The light source driving board 563 is correspondingly electrically connected to the dot light source 561, and generates a drive signal to drive the dot light source 561 to operate. In this embodiment, the dot light source 561 is divided into a plurality of blocks in terms of region. Each of the blocks corresponds to a local grayscale of the liquid crystal display panel 531 for displaying content to adjust a luminance of the region to achieve the objectives of energy saving and image quality enhancement.

Specifically, with respect to a display signal of each display image frame, a dynamic dimming pad 535 is provided. The dynamic dimming pad 535 receives an image frame signal, a control signal, and a power signal from the liquid crystal display panel 531, processes these signals and acquire grayscale information of each region, generates a dynamic dimming signal, and transmits the dynamic dimming signal to the light source driving board 563. The light source driving board 563 correspondingly drives, based on the dynamic dimming signal, the dot light source 561 to operate. During this process, the plurality of dot light sources 561 dynamically outputs lights having different intensities based on display needs of the display image frame, so as to achieve the objectives of energy saving and image quality and contrast enhancement.

The electromagnetic input module 57 includes a handwriting control board 571, a base layer 573, a magnetic barrier plate 575, and a touch layer 577. The magnetic barrier plate 575 and the base layer 573 are stacked over each other. The touch layer 577 includes column antennas and row antennas that are arranged into an array. The row antennas and the column antennas are respectively arranged on two opposing side surfaces of the base layer 573. The dot light sources 561 are arrayed on a side surface of the base layer 573 proximal to the light guiding plate 551, and the dot light sources 561 and the antennas on one side of the touch layer 577 are arranged on the same side surface. The handwriting control board 571 is correspondingly electrically connected to the touch layer 577, and outputs a control signal to control a write operating state signal of the touch layer 577. And the display module 53 is stacked on a side of the light guiding module 55 distal from the magnetic barrier plate 575.

Figure 7:
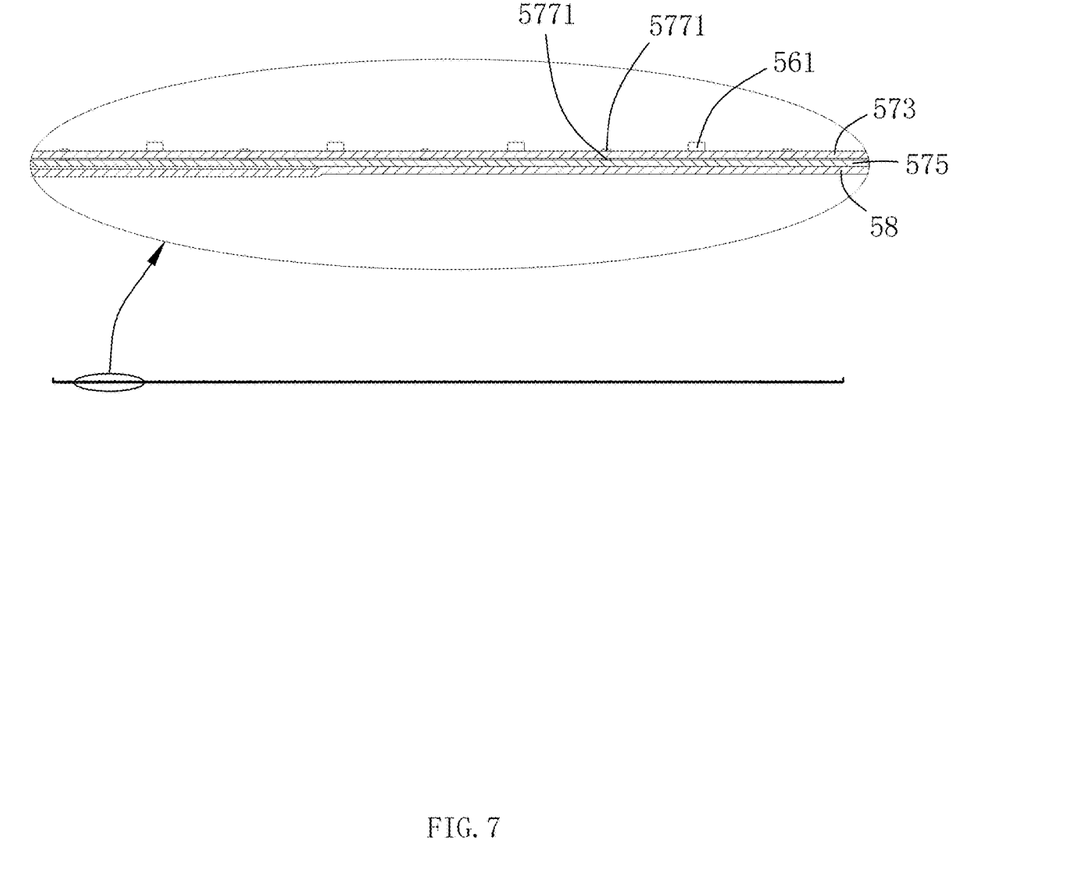
FIG. 7 is a side sectional view of the electromagnetic input module in FIG. 4.
Figure 8:
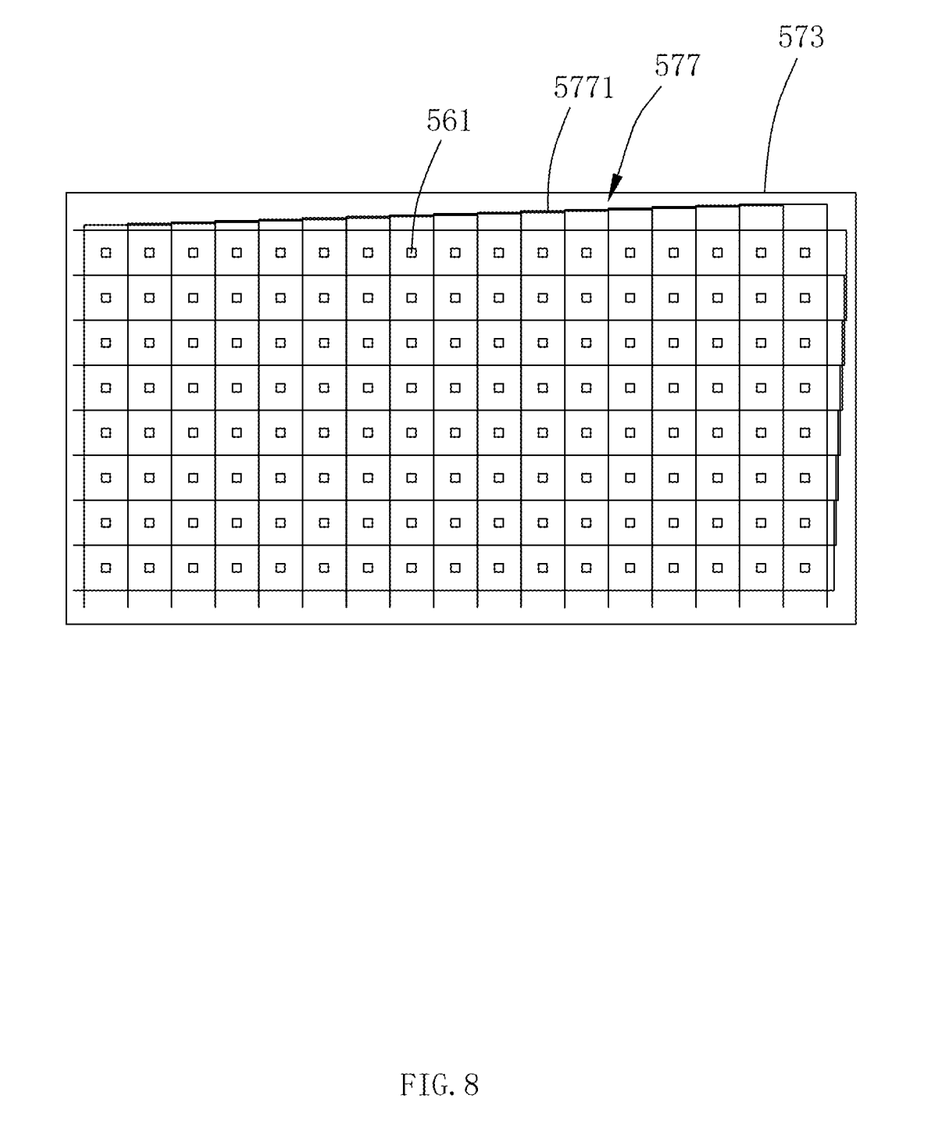
FIG. 8 is a schematic plan view of the electromagnetic input module in FIG. 4.

Further referring to FIG. 7 and FIG. 8, FIG. 7 is a side sectional view of the electromagnetic input module as illustrated in FIG. 5, and FIG. 8 is a schematic plan view of the electromagnetic input module as illustrated in FIG. 4. On the surface of the base layer 573, the plurality of dot light sources 561 are arranged into an array. The touch layer 577 includes a plurality of antennas 5771 arrayed on the surface of the base layer 573. The row antennas 5771 are arranged on a side surface of the base layer 573, and the column antennas 5771 are arranged on the other side surface of the base layer 573. Adjacent row antennas 5771 are spaced apart from each other, adjacent column antennas 5771 are spaced apart from each other, and the dot light sources 561 are sandwiched between the adjacent row antennas 5771 or the adjacent column antennas 5771. That is, the dot light sources 561 and the antennas 5771 are spaced apart from each other in sequence. Along an extension direction of the antennas 5771, the dot light sources 561 are arrayed as being parallel to the extension direction of the antennas 5771; and along a direction perpendicular to the extension direction of the antennas 5771, the dot light sources 561 are uniformly spaced apart from each other. A plurality of dot light source driving electrodes are arranged on the surface of the base layer 573, and are respectively electrically connected to the dot light sources 561. In addition, the antennas 5771 on the surface of the base layer 573 are overlaid on the base layer 573 by copper foils to form the touch layer 577. The dot light sources 561 and the antennas 5771 are arranged on the same surface, and are insulated and spaced apart from each other. The base layer 573 is a multi-layer printed circuit board, the dot light sources 561 are encapsulated on the surface of the base layer 573, and the antennas 5771 are printed on the surface of the base layer 573.

The backplane 58 is an aluminum metal housing having a receiving space, and is arranged on an outer side of the magnetic barrier plate 575. The backplane 58 and the enhanced frame collaboratively enclose a receiving space configured to receive and fix and hold the magnetic input module 57, the light emitting module 56, and the light guiding module 55.

The lower case 59 and the upper case 51 are consistently machined by a plastic material, and the lower case 59 and the upper case 51 are assembled by a snap structure. Nevertheless, the lower case 59 and the upper case 51 may also be latched and fixed by screws or other fashions.

The electromagnetic pen display 50 is assembled by the following steps:

First, the base layer 573 is provided, the magnetic barrier plate 575 and the base layer 573 are stacked, and the column antennas and the row antennas of the touch layer 577 is arranged on two opposing side surfaces of the base layer 573.

Second, the dot light sources 561 are arrayed on a side surface of the base layer 573, and the dot light sources 561 and the touch layer 577 are arranged on the base layer 573, wherein the dot light sources 561 are sandwiched between the antennas 5771 in the touch layer 577 and are insulated and spaced apart from the antennas 5771, such that the light emitting module 56 and the magnetic input module 57 are integrally assembled.

Third, the backplane 58 and the enhanced frame are provided, wherein the backplane 58 and the enhanced frame collaboratively enclose a receiving space, and from top to bottom, the optical film 553, the light guiding plate 551, the dot light sources 561, the base layer 573, and the magnetic barrier plate 575 are received in the receiving space.

Afterwards, the display module 53 are overlaid on a side surface of the enhanced frame distal from the backplane 58.

Finally, the upper case 51 and the lower case 59 are provided, wherein the upper case 51 and the lower case 59 are snapped and assembled to receive the display module 53, the light guiding module 55, the light emitting module 56, the electromagnetic input module 57, and the backplane 58 to form an integral structure.

Heretofore, the electromagnetic pen display 50 is assembled.

In this embodiment, when the light source driving board 563 generates a drive signal to drive the dot light sources 561 to dynamically adjust the luminance, the handwriting control board 571 controls the touch layer 577 to be in a non-signal receive state; and when the light source driving board 563 generates a drive signal to drive the dot light sources 561 to stably and constantly operate, the handwriting control board 571 controls the touch layer 577 to be in a signal receive state.

Relative to the related art, in the electromagnetic input module 57 of the electromagnetic pen display 50 according to the present disclosure, in a period where the light source driving board 563 of the light emitting module 56 generates a constant drive signal, the handwriting control board 571 controls the touch layer 577 to be in the signal receive state, thereby preventing the light emitting module 56 from causing interference to the electromagnetic input module 57. Accordingly, on the premise that no interference is caused to the electromagnetic input module 57, the dot light sources 561 and the antennas 5771 are arranged on the same side surface of the base layer 573, the light emitting module 56 and the electromagnetic input module are integrated, thereby reducing the number of element and facilitating assembling. In this way, the entire structure is more compact, and an entire thickness of the electromagnetic pen display 50 is further reduced.

When the electromagnetic pen display 50 operates, the display driving board 533 generates a drive signal to drive row and column scanning of the liquid crystal display panel 531, that is, a row synchronization signal H-SYNC and a field synchronization signal V-SYNC. The row synchronization signal H-SYNN is an auxiliary signal indicating that the row scanning ends, being transmitted during row blanking. The field synchronization signal V-SYNN is an auxiliary signal indicating that the scanning of the current image frame ends, being transmitted during field blanking. During displaying each image frame, when the liquid crystal display panel 531 receives the row synchronization signal, the display driving board 533 drives the display by changing rows; and when the liquid crystal display panel 531 receives the field synchronization signal, the display driving board 533 drives the display by changing frames. During the period of transmitting the row synchronization and the field synchronization signal, that is, a blanking period, when the liquid crystal display panel 531 does not receive a drive signal from the display driving board 533, correspondingly, no interference signal is caused to affect signal reception of the electromagnetic input module 57; and on the contrary, when the liquid crystal display panel 531 receives a drive signal from the display driving board 533, that is, a non-blanking period, the liquid crystal display panel 531 receives the drive signal from the display driving board 533, which causes interference to signal reception of the electromagnetic input module 57, thereby affecting data report rate.

The handwriting control board 571 receives the row synchronization signal H-SYNC and the field synchronization signal V-SYNC from the display driving board 533. In the meantime, the handwriting control board 571 generates a control signal to control the antennas 5771 in the touch layer 577 to be in a transmit state, a receive state, or a processing state. Correspondingly, when the handwriting control board 571 controls the antennas 5771 to be in the receive state, the row synchronization signal and the field synchronization signal of the display driving board 533 are in the blanking period. That is, when the antennas 5771 are in the receive state, the liquid crystal display panel 531 is in the blanking period and does not receive a display drive signal; or when the antennas 5771 are in the transmit state or the processing state, the display driving board 533 drives the liquid crystal display panel 531 to display; or when the antennas 5771 are in the receive state, the field synchronization signal and the row synchronization signal of the display driving board 533 are in the blanking period.

During the process that the display driving board 533 drives the liquid crystal display panel 531 to display, a drive signal is correspondingly generated, and the drive signal generated by the display driving board 533 causes crosstalk to reception of the write input signal of the antennas 5771 of the touch layer 577, and hence the data report rate of the touch layer 577 is affected. Therefore, in the embodiment of the present disclosure, during the process of receiving the signals by the antennas 5771 in the touch layer 577, the liquid crystal display panel 531 is set to be in the blanking period and receive the row synchronization signal and the field synchronization signal. In this way, the data report rate and accuracy of the electromagnetic input module 57 are improved, and crosstalk caused by the drive signal is reduced.

In another aspect, when the electromagnetic pen display 50 operates, to improve dynamic rendering contrast of the display image frame, the dynamic dimming pad 535 simultaneously generates the dynamic dimming signal to the light source driving board 563. The light source driving board 563 dynamically adjust the signal and correspondingly generates a dynamic drive signal based on the dynamic dimming signal, to drive the dot light sources 561 to emit light under the drive signal from the light source driving board 563. In this way, local dynamic adjustment of the light emitting module 56 is implemented, and the dynamic rendering contrast of the display image frame is improved. During this process, the drive signals from the light source driving board 563 are in a dynamic varying process. Therefore, the drive signals cause crosstalk to signal reception of the electronic input module 57.

Correspondingly, the handwriting control board 571 receives the dynamic dimming signal from the dynamic dimming pad 535 or the drive signal from the light source driving board 563, and controls the antennas 5771 in the touch layer 577 to be in the non-signal receive state. Specifically, when the antennas 5771 in the touch layer 577 are in the signal receive state, the light source driving board 563 generates a constant current or constant voltage drive signal to drive the dot light sources 561 to emit light; and on the contrary, when the light source driving board 563 generates a dynamic current or dynamic voltage drive signal to drive the dot light sources 561 to emit light, the antennas 5771 in the touch layer 577 are in the non-signal receive state, that is, the transmit state or the processing state.

In this embodiment, during the process that the liquid crystal display panel 531 receives the drive signal from the display driving board 533, the drive signal from the display driving board 533 may cause interference to signal reception of the electromagnetic input module 57. In still another aspect, to improve dynamic contract of the display image frame, the light emitting module 56 dynamically adjust a light emission intensity based on the dynamic dimming signal, and thus dynamic luminance adjustment is achieved for the display image. During the dynamic luminance adjustment of the dot light sources 561, dynamic variations of the drive signal of the display driving board 533 may affect signal reception of the electromagnetic input module 57.

With respect to the interference of the liquid crystal display panel 531, the handwriting control board 571 of the electromagnetic input module 57 receives the row synchronization signal and the field synchronization signal from the display driving board 533, and correspondingly control the touch layer 577 to be in the signal receive state. Considering that the row and field synchronization signals of the display driving board 533 are transmitted in the blanking period, the liquid crystal display panel 531 causes no interference to signal reception of the touch layer 577. In this way, the data report rate and compatibility are improved, and interference is reduced.

With respect to the interference caused by dynamic dimming of the light emitting module 56, the handwriting control board 571 of the electromagnetic input module 57 receives the dynamic dimming signal from the dynamic dimming pad 535 or the drive signal from the light source driving board 563, and correspondingly controls the touch layer 577 to be in the non-signal receive state. The drive signal of the light source driving board 563 for dynamically adjusting the light emission intensity of the dot light sources 561 may cause interference to signal reception of the electromagnetic input module 57, the antennas 5771 in the touch layer 577 are adjusted to be in the non-signal receive state. When the drive signal of the light source driving board 563 is in a constant and stable state, the antennas 5771 in the touch layer 577 are adjusted to be in the signal receive state, such that interference is prevented, and the compatibility and data report rate are improved.

In an exemplary embodiment, the dynamic adjustment of the light emitting module 56 may be global dimming or local dimming. For a person skilled in the art, since the dynamic current signal or voltage signal may cause interference to the magnetic field, any concept of controlling the touch layer 577 to be in the non-signal receive state by the handwriting control board 571 to prevent interference caused to signal reception of the touch layer 577 by dynamically adjusting the drive signal of the light source driving board 563 shall fall within the scope of the present disclosure.

Further, the light sources of the light emitting module 56 are not merely limited to dot light sources, but may also be linear light sources that are arrayed. Nevertheless, the light guiding plate 551 of the light guiding module 55 may be reduced according to the actual display needs.

Further, the light emitting module 56 and the touch layer 577 may also be arranged in the same layer. Since the touch layer 577 receives input signals in the blanking period, if the light emitting module 56 drives, by a constant voltage or current signal, the light sources to operate, the touch layer 577 may not be subject to interference caused by a drive signal of the light emitting 56, and thus relative positions between the touch layer 577 and the light emitting 56 may not be affected.

Relative to the related art, in the electromagnetic pen display 50 according to the present disclosure, the handwriting control board 571 correspondingly generates the control signal to control the touch layer 577 to be in the signal receive state or the non-signal receive state in a blanking period where the display driving board 533 generates the row and field synchronization signals or in a light source dynamic adjustment period of the light emitting module 56. In this way, interference caused by the display module 53 and the light emitting module 56 to the touch layer 577 is prevented, and the compatibility and data report rate are improved.

It is to be understood, however, that even though numerous characteristics and advantages of the present exemplary embodiments have been set forth in the foregoing description, together with details of the structures and functions of the embodiments, the disclosure is illustrative only, and changes may be made in detail, especially in matters of shape, size, and arrangement of parts within the principles of the invention to the full extent indicated by the broad general meaning of the terms where the appended claims are expressed.

What is claimed is:

1. An electromagnetic pen display, comprising:
   a display module, comprising:
      a liquid crystal display panel and a display image frame; and
      a dynamic dimming pad, the dynamic dimming pad being configured to generate a dynamic dimming signal based on information of the display image frame of the liquid crystal display panel;
   a light emitting module, comprising:
      a light source driving board; and
      a plurality of light sources, the plurality of light sources being correspondingly electrically connected to the light source driving board, the light source driving board being configured to correspondingly dynamically driving a light emission luminance of the plurality of light sources in response to receiving a dynamic dimming signal from the dynamic dimming pad; and an electromagnetic input module, configured to selectively receive a write input signal;
   an electromagnetic input module, comprising: a handwriting control board, a base layer, a magnetic barrier plate, and a touch layer; wherein the base layer and the magnetic barrier plate are stacked over each other, the touch layer comprises a row antenna and a column antenna that are arranged into an array and are arranged on two opposing side surfaces of the base layer, and the handwriting control board selectively receives the write input signal;

wherein the light source and the antenna on one side of the touch layer are arranged in a same layer, the light sources are arrayed between the antennas, and the antenna is insulated from the light source.

2. The electromagnetic pen display according to claim 1, wherein the electromagnetic input module comprises a signal receive state and a non-signal receive state; wherein when the light source driving board generates a drive signal to drive the light source to dynamically adjust the luminance, the electromagnetic input module is selectively in the non-signal receive state;

and when the light source driving board generates a drive signal to drive the light source to stably operate under a constant luminance, the electromagnetic input module is in the signal receive state.

3. The electromagnetic pen display according to claim 2, wherein the display module further comprises a display driving board; wherein in a row-field blanking period where the display driving board generates a row synchronization signal or a field synchronization signal, the dynamic dimming pad stops generating the dynamic dimming signal, the light source driving board generates a constant current or voltage signal to drive the light source to stably operate under the constant luminance, and the electromagnetic input module receives the write input signal.

4. The electromagnetic pen display according to claim 3, wherein the display driving board generates a drive signal in a non-row-field blanking period, the dynamic dimming pad generates the dynamic dimming signal, the light source driving board dynamically drives the light source to operate, and the electromagnetic input module stops receiving the write input signal.

5. The electromagnetic pen display according to claim 1, wherein the base layer is a multi-layer printed circuit board, the light source is encapsulated on a surface of the base layer, and the antenna is printed on the surface of the base layer.

6. The electromagnetic pen display according to claim 1, further comprising a backplane; wherein the light emitting module and the electromagnetic input module are received in the backplane.

7. The electromagnetic pen display according to claim 6, further comprising an upper case, a lower case, and a light guiding module; wherein the display module is stacked on a side of the light guiding module distal from the magnetic barrier plate, the upper case and the lower case collaboratively enclose a receiving space configured to receive the display module, the light guiding module, the light emitting module, the electromagnetic input module, and the backplane.

8. The electromagnetic pen display according to claim 1, wherein the light source is a dot light source or a line light source.

* * * * *